United States Patent [19]

Masclet et al.

[11] 4,367,529

[45] Jan. 4, 1983

[54] AUTOMATIC BRAKING METHOD AND APPARATUS

[75] Inventors: Jean Masclet, Paris; Claude Marcheron, Montrouge, both of France

[73] Assignee: Messier-Hispano-Bugatti, Montrouge, France

[21] Appl. No.: 101,139

[22] Filed: Dec. 7, 1979

Related U.S. Application Data

[63] Continuation of Ser. No. 850,824, Nov. 11, 1977, abandoned.

[30] Foreign Application Priority Data

Nov. 29, 1976 [FR] France .................................. 76 35970

[51] Int. Cl.³ .......................... G06F 15/50; B60T 8/02
[52] U.S. Cl. ....................................... 364/426; 303/93; 303/95
[58] Field of Search .................... 303/93, 95, 100, 107, 303/109; 364/426; 244/111; 246/182 B, 182 C; 73/503

[56] References Cited

U.S. PATENT DOCUMENTS 3,920,204 11/1975 Bissell ................................. 364/426
3,920,282 11/1975 Devlieg .............................. 244/111
4,078,845 3/1978 Amberg et al. ..................... 244/111

Primary Examiner—Errol A. Krass
Attorney, Agent, or Firm—Scully, Scott, Murphy & Presser

[57] ABSTRACT

An automatic braking method and apparatus for a vehicle, having particular applicability to aircraft, wherein a program deceleration signal is generated according to a preselected deceleration. A signal which is a function of the actual speed of the vehicle is compared with the program signal, and a difference signal is produced. The difference signal controls the actuation of the braking system of the vehicle to result in braking thereof in accordance with the preselected deceleration.

8 Claims, 18 Drawing Figures

AUTOMATIC BRAKING METHOD AND APPARATUS

This application is a continuation of application Ser. No. 850,824, now abandoned, for Automatic Braking Method and Apparatus, filed Nov. 11, 1977.

BACKGROUND OF THE INVENTION

1. Field of the Invention

The present invention relates generally to a method of and system for automatically controlling braking of a vehicle, and is particularly applicable to aircraft.

2. Discussion of the Prior Art

Automatic braking means and methods have been previously proposed for aircraft which make it possible to control the deceleration of the aircraft during braking at a preselected rate of deceleration. In these systems the deceleration of the aircraft is measured by an accelerometer mounted on board the aircraft to provide a signal which is a function of the longitudinal deceleration of the aircraft. The signal is compared to a desired value signal, and a resultant difference signal controls the level of braking, as for example by controlling the pressure applied to the wheel brakes. A system of this type has the disadvantage of requiring the use of an accelerometer which is a relatively expensive item. Also with this sytem it is not possible to accurately measure the horizontal acceleration of the vehicle at certain attitudes of the aircraft, particularly when the axis of the accelerometer is not parallel to the ground.

SUMMARY OF THE INVENTION

The present invention makes it possible to slow down, and if desired stop, the vehicle by means of brakes (for example wheel brakes), simplifying the work of the pilot during braking. Particularly with aircraft, it simplifies the work of a pilot during landing by slowing down, and if applicable stopping, the aircraft in accordance with a law of deceleration previously chosen by the pilot. Such simplification of the pilot's work is particularly advantageous when landing conditions are poor.

Further advantages provided by the present invention are that braking can be applied as soon as possible, without potential loss of time; and braking is more comfortable for passengers because peaks of deceleration, which may be caused by thrust reversers, parachutes or other equivalent means, are reduced.

The method and system of the present invention also makes it possible to apply more even braking, which has the additional advantage of lessening the wear on elements involved in braking such as the brakes and tires.

According to one aspect of the present invention, the braking of a vehicle is automatically controlled in a manner wherein a function of the true speed of the vehicle Va (which may be Va itself) is compared with a program speed Vp to obtain a difference signal ε which is used to control braking. The program speed varies according to a substantially predetermined law of deceleration, which is capable of being further modulated or changed according to time, the speed of the vehicle Va, the distance available for stoppage and/or other parameters such as cross winds, alignment of the aircraft on the runway, etc.

Accordingly the present invention is a new concept of automatic braking comprising making the speed of the vehicle subject to a speed programmed according to time. A program speed Vp, programmed on the basis of a law γ of specific deceleration, is defined, compared with a function of the real speed of the vehicle Va (which may be Va itself), and the difference signal obtained therefrom is used to control the force of braking.

The programmed speed law can be expressed as:

$$Vp = Vo - \int_o^t \gamma(t, Va, d, \ldots) \, dt$$

in which Vo represents the initial program speed, and corresponds to the speed of the vehicle at the origin of braking, t corresponds to time, Va to the actual speed of the vehicle, and d to the distance available for stopping. The list of parameters of which deceleration is a function is not limited to those previously specified, but is capable of including others, for example those relative to various braking means provided on the vehicle.

When the braking means include wheel brakes, the initial program speed Vo will advantageously be shown in the transcript of the measurement of the speed of the wheels prior to application of the brakes, but Vo may also be measured by other means capable of detecting the speed of the vehicle, such as DOPPLER radar, ground beacons, special speed calculating means or an inertial station.

According to another aspect of the present invention, an automatic braking system for a vehicle is provided which includes a programmer formed as an integrator which is charged at the initiation of braking by sensing means which generates a signal representing the speed of the vehicle. A regulator delivers a difference signal to operate brakes of the vehicle in which the regular receives a program speed signal generated by the programmer and a vehicle speed signal generated by the sensing means.

The brakes of the vehicle may be conventional wheel brakes in which a control pressure or rate of control flow are regulated to control shoe brakes, or thrust reversers, or air brakes in which the angle of deflection is controlled. Measurement of the actual speed of the vehicle may be obtained, in the same way as the initial program speed, from the speed of wheels which are not being braked, from other types of systems already mentioned, or possibly from the speed of the braked wheels.

Automatic braking may be initiated externally of the automatic braking system which follows or precedes triggering of the system by the pilot. The initiation may be processed by a suitable manual or automatic logic assembly. For example, for an aircraft, it might be initiated by the lift dischargers. In one simple embodiment of the invention, the desired deceleration will be a constant, and its value is chosen by the pilot from given range comprised of three levels of deceleration: a low level at 0.15 g; a medium level at 0.2 g; and a high level at 0.3 g. Once it has been preselected by the pilot, the rate of deceleration may be represented by, for example, an electrical voltage applied to the input of an integrator immediately after the automatic braking order is given. The integrator generates an output signal representing the desired program speed.

The program may be cancelled or modified by the pilot at any time. If cancelled, the integrator returns to its initial state to be ready for further use. In particular, it will transcribe the speed of the vehicle to have a fresh initial program value available, required for a fresh use of the automatic braking system.

If during braking the deceleration of the automatic braking program is not obtained because of insufficiency of braking caused by either the braking system itself or by low adhesion to the ground (skidding), the program speed will not be allowed to fall below a given function of the actual speed of the vehicle (which may be the actual speed itself). In this case, the program speed transcribes the given function of the actual speed of the vehicle to ensure that the vehicle achieves the selected deceleration as soon as the vehicular braking capacity becomes inadequate, without causing any sudden transitory effect and without loss of time.

The output signal of the integrating programmer is directed as a desired speed value to the input of the regulator which also receives a signal representing the actual speed of the vehicle generated for example by a tachometric generator.

The program speed signal Vp is compared with a function of the vehicle speed signal Va (which may be the signal Va itself), and the regulator generates a difference signal which is used to regulate braking. In hydraulic braking systems the difference signal is amplified in a known manner and is directed to one or more electrohydraulic distributors (proportional or stepped action) to regulate the pressure or possibly the rate of flow to the braking members to bring the actual speed of the vehicle to the program speed.

The integrator and regulator may be electronic components of any suitable kind, either analog or digital in nature, or alternatively fluid or pneumatic components may be utilized.

In a first embodiment of the invention a hydraulic braking system is controlled by an electrically operated valve, with regulation of the pressure being accomplished by an electrohydraulic distributor. For example, a servo-valve adjusts the pressure in the braking system in accordance with the magnitude of an electric control signal.

The application to the braking means either of a normal braking pressure or a pressure modulated by the intervention of the automatic braking system will be discriminated by known technology in the art of hydraulic control sytems such as shuttle valves.

In a second embodiment of the invention, two electrohydraulic servo-valves are used, one of which controls the pressure applied to a first series of braking means while the second controls the pressure applied to a second series of braking means, for example the left and right hand braking systems of an aircraft. Two servo-valves may receive either the same signal from the automatic brake regulator or different signals to differentially effect the braking means of the vehicle. This differential braking action may be used to correct the path of the aircraft on a landing runway, to compensate for the effect of a cross wind, alignment of the aircraft on the runway, or any other parameter to steer the aircraft along a particular path.

According to another aspect of the present invention, the braking system is applied to a vehicle which is fitted with brakes equipped with an anti-skid device. Generally, these vehicles are already equipped with at least one electrohydraulic distributor which makes it possible to modulate the pressure in the brake or brakes as a function of an electrical command signal given by an anti-skid regulator. When the electrohydraulic distributors of the anti-skid devices are not progressive in action, the vehicle may still be fitted with the automatic braking system according to the present invention through the addition of one or more electrohydraulic servo-operated valves. However, this results in a heavy and expensive system because of the additional equipment required. When the electrohydraulic distributors of the anti-skid device are progressive in action, they may be used directly to control the pressure to the brakes in accordance with the control signal produced by the automatic brake regulator.

The anti-skid device remains in control of the braked wheels, and cuts in to reduce the pressure in the brake or brakes of the skidding wheels.

The automatic braking signal and the anti-skid signal may be combined in a system which enables either to function normally, but not simultaneously and not with a sudden transition.

BRIEF DESCRIPTION OF THE DRAWINGS

The invention is diagrammatically illustrated in detail in the accompanying drawings, in which.

DETAILED DESCRIPTION OF THE DRAWINGS

Figure 1:
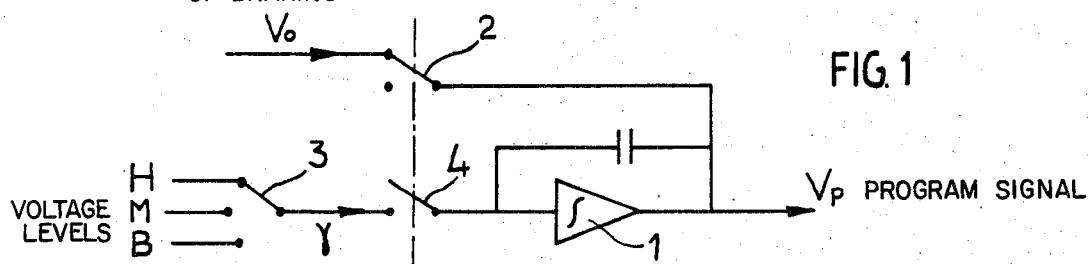
FIG. 1 shows a circuit for producing a program in an automatic braking system according to the present invention.
Figure 3:
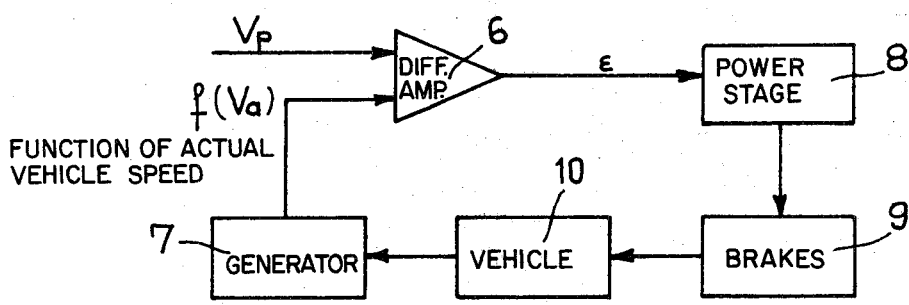
FIG. 3 shows a control loop for controlling the vehicle speed as a function of the program speed.

The system in its simplest form is illustrated in FIGS. 1 and 3. In accordance with the circuit of FIG. 1, a signal Vp is generated which represents a programmed deceleration for the vehicle. This program signal Vp is then compared in the circuit of FIG. 3 with the output of a generator 7 which generates a signal f(Va) proportional to the actual speed of the vehicle. Signal Va may be generated by means of a tachometric generator mounted to a wheel of the aircraft. The two signals are then compared in a differential amplifier 6, and the resultant signal ε controls the braking system 9 of vehicle 10 via power stage 8.

Referring to FIG. 1, a signal representing program speed Vp as a function of time is provided by an electronic integrator 1 (which is a type of circuit known per se) which is charged at the initiation of braking through a switch 2 with an electrical voltage Vo representing the speed of the vehicle at the origin of braking. The electronic integrator is then discharged by a signal γ, corresponding to the deceleration chosen by the pilot from among three values, for example constant values (high H, medium M and low B) by operating a selector switch 3. The three signals H, M and B may simply be three different voltage levels, H indicating a high voltage level signal, M for a medium voltage level signal, and B for a low voltage level signal. Switch 3 is operated by the pilot in accordance with his selection of a high, medium or low braking level, and directs the chosen voltage of integrating amplifier 1. Switches 2 and 4 initiate operation of the automatic braking system. In this system the capacitor is initially charged by a voltage Vo which is representative of the speed of the vehicle at the origin of braking and is then discharged at a controlled rate by either of signals H, M or B to generate the control signal Vp to control braking. This may be visualized by referring to the graphs of FIGS. 17 and 18 which illustrate the magnitude of Vp as a function of time. Automatic braking is triggered by operation of switches 2 and 4, with switch 4 being connected in series with the selector switch 3. The integrator then furnishes the signal Vp representing the program speed according to the equation $Vp = Vo - \gamma t$.

Figure 2:
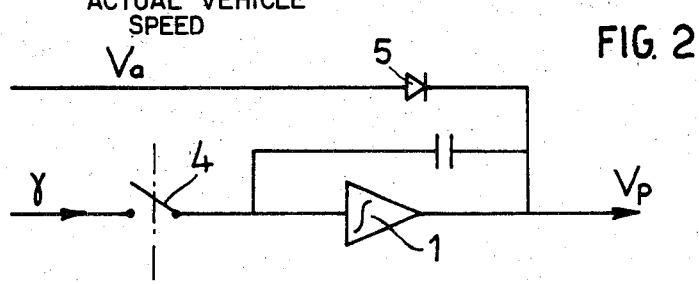
FIG. 2 illustrates a logic arrangement to prevent the program speed from being less than the actual speed of the vehicle.

As shown in FIG. 2, the program may be modified or discontinued at any time by switch 4 which may be operated automatically or by the pilot. If switch 4 is open, integrator 1 stores a vehicle speed signal Va which is available as an initial value for the next usage of the automatic braking system. A diode 5 prevents Vp falling below Va during the course of braking if the deceleration γ according to the program cannot be achieved. In this case, Vp is the stored Va in order to avoid sudden transitions when the desired deceleration is again obtained by intervention of the automatic braking system.

Referring to FIG. 3, the signal Vp is passed to a regulator 6 which also receives a signal which is a function of the vehicle speed Va (which may be the vehicle speed signal Va itself), generated by a unit 7 in a known manner.

The Regulator 6 produces a difference signal ε which is directed to a power stage 8 furnishing a control signal to braking means 9, operation of which brings about braking of vehicle 10 in accordance with the deceleration of the vehicle chosen by the pilot.

Figure 4:
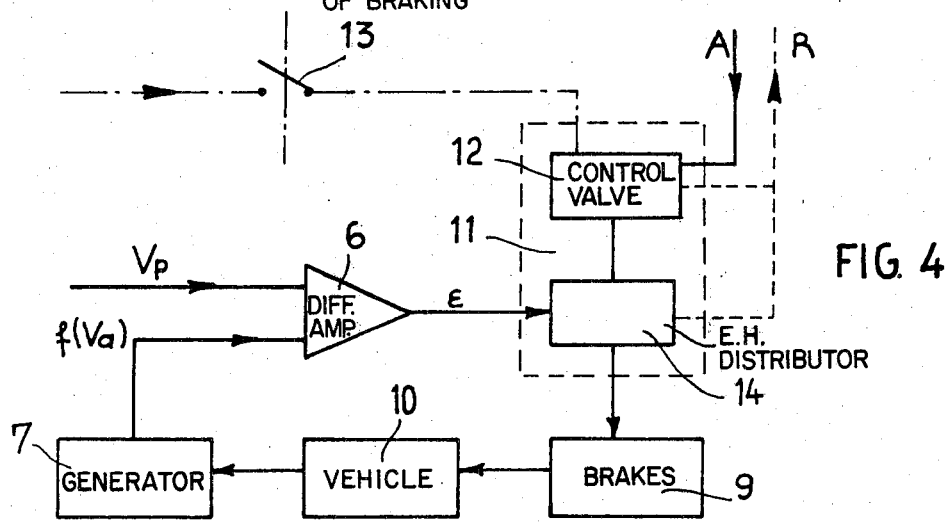
FIG. 4 illustrates a system for controlling the speed of a vehicle with hydraulically operated brakes.

In a first embodiment of an automatic hydraulic braking system shown in FIG. 4, all of the hydraulic braking means 9 are supplied with hydraulic fluid through a supply line A from a hydraulic source (not shown). The fluid is returned to the source by return line R from a hydraulic distributing assembly 11. Assembly 11 includes an electrically operated valve 12 the operation of which is initiated by a switch 13 which is closed by the automatic braking order. An electrohydraulic distributor 14, of the servo-valve type, receives the difference signal ε from the regulator 6, and in accordance therewith modulates the pressure to the braking means 9.

Figure 5:
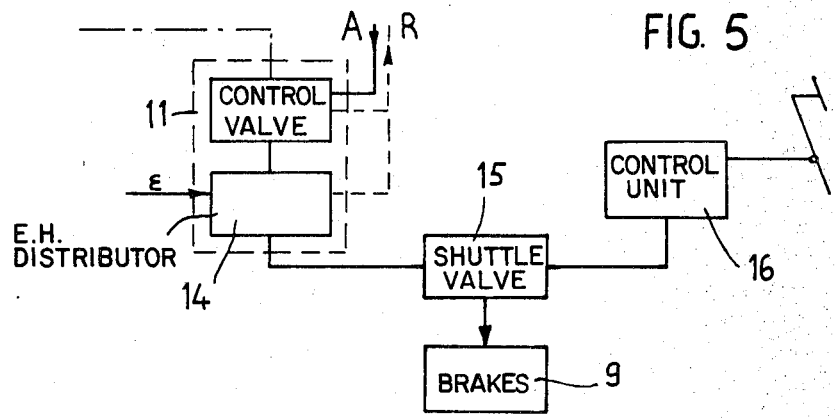
FIG. 5 shows a hydraulic control system for the brakes.

It is necessary that the braking means 9 be capable of being operated in the normal manner, for instance manually, so that they can function without the automatic braking system. Accordingly, a shuttle valve 15, FIG. 5, which may be any suitable known type, transmits to the braking means 9 the operating pressure it receives, which is either the pressure originating in a conventional hydraulic brake control unit 16 (when braking is applied manually), or the modulated operating pressure from the distributor 11, more particularly from the electrohydraulic distributor 14 during automatic braking.

Figure 6:
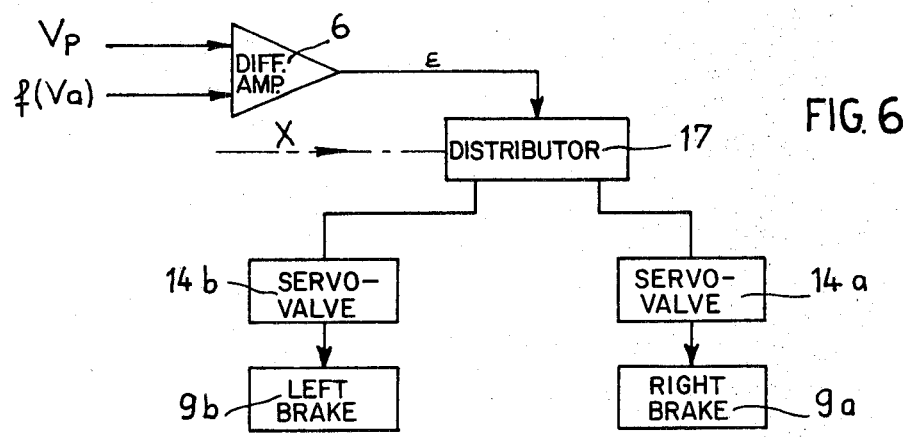
FIG. 6 shows a device which permits differential operation of the brakes.

FIG. 6 illustrates another embodiment which employs two servo-valves 14a and 14b which control respectively the pressures applied to the right and left braking means 9a and 9b of the vehicle. The two servo-valves 14a and 14b having one or perhaps even two electrovalves (not shown) are controlled in parallel by a distributor 17 receiving the output signal of the regulator 6 and are sensitive to one or more external parameters X, for example the effects of cross winds, to permit differential braking control over the vehicle.

Figure 7:
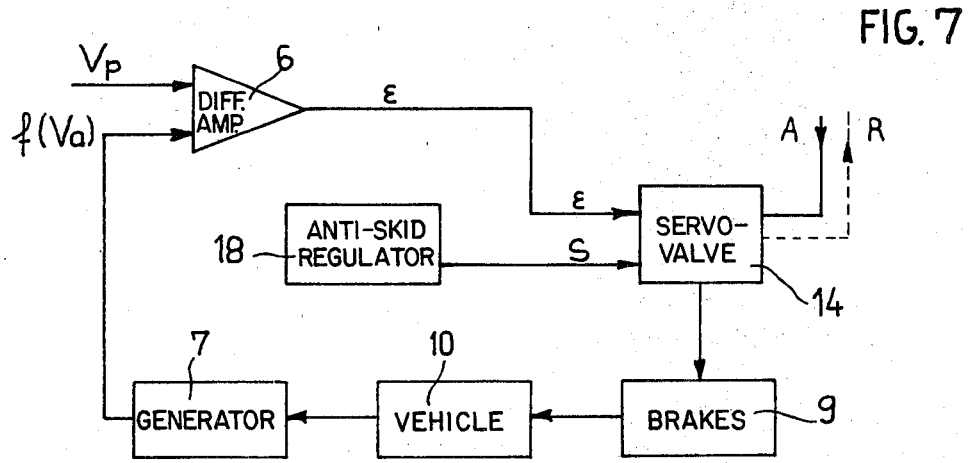
FIG. 7 shows the installation of the invention on a vehicle fitted with an anti-skid system.
Figure 12:
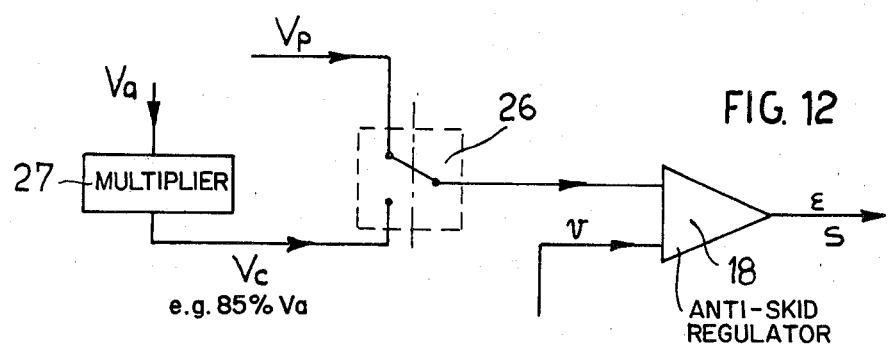
FIGS. 12 and 13 show two alternative approaches for discriminating control signals to a regulator which is common to the anti-skid and automatic braking system.
Figure 13:
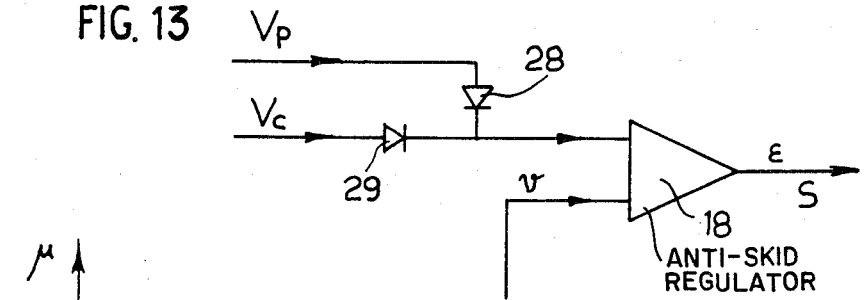

FIG. 7 illustrates the structural interrelationship between the anti-skid system and the automatic braking system. When the speed of the vehicle cannot be adjusted to the program speed Vp, which happens when braking is not accomplished in accordance with the law of selected deceleration, the system then utilizes a signal from a supervisory anti-skid system to control the braking. When braking is not accomplished according to the law of selected deceleration, the reason is often caused by skidding of the wheels, and accordingly the anti-skid regulator is brought into play. The two systems are interconnected through an electrohydraulic distributor 14 which can be a servo-valve, and the anti-skid regulator operates to decrease the pressure on the brakes 9 if any tendency to skid is detected. Anti-skid apparatus are well-known in the art. One known type of anti-skid system includes a regulator 18 (FIGS. 7, 12, 13 and 16) which receives a first input signal indicative of the speed of the braked wheels Vc (which is derived from Va as illustrated in FIGS. 12 and 13). The anti-skid apparatus functions as an automatic braking regulator, comparing v with the greater of Vp or Vc (with the discrimination being accomplished by diodes 28, 29) to produce the error signal ε which is used to control braking. If Vp is unavailable, then the discrimination logic substitutes signal Vc for the unavailable signal Vp, as illustrated and explained with reference to FIGS. 12 and 13. The diodes function in a known manner such that the stronger of signals Vp or Vc is directed to regulator 18. The diode receiving the weaker of the two signals will be reverse biased and will not conduct, thereby allowing only the diode receiving the stronger signal to pass on its signal. The output of this circuit is then directed to the regulator 18 of the anti-skidding system. Accordingly, braking according to the teachings of the present patent application is accomplished by the system such that the error signal ε will ve Vp−v or Vc−v, depending upon which of the two signals (Vp or Vc) is stronger and has a larger amplitude as determined by the diodes.

Referring back to FIG. 7, there is illustrated an embodiment of an automatic brake device for a vehicle fitted with braked wheels and equipped with an anti-skid device, the latter comprising an electrohydraulic servo-valve 14 connected to a supply line A and a return line R to a tank which serves as a source of hydraulic fluid. The valve 14 modulates the pressure delivered to the wheel brakes 9 according to a signal S produced by an anti-skid regulator 18 sensitive to the behaviour of the braked wheels of the vehicle 10. Parallel with the signal S, the servo-valve 14 also receives the signal ε from the automatic brake regulator 6. This embodiment is interesting in that it is possible to use elements which are mostly already present in the anti-skid device to accomplish automatic braking. In this arrangement, the anti-skid regulator 18 operates to reduce the pressure to the brakes 9 if any tendency to skid is detected, whether the automatic braking system is operative or inoperative.

Figure 8:
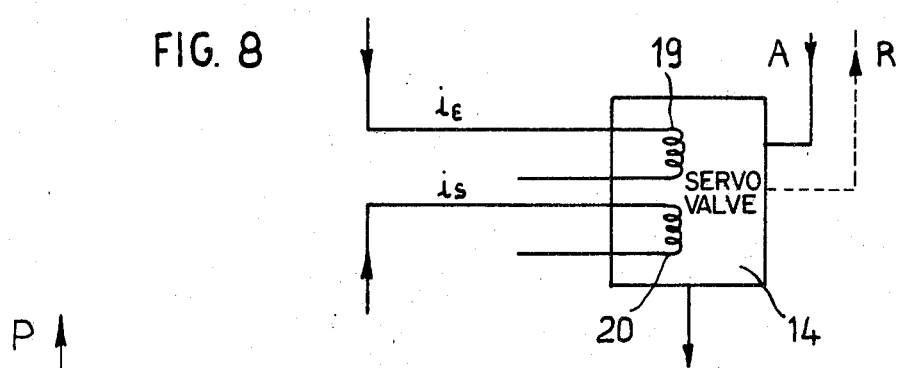
FIGS. 8 and 9 illustrate respectively a two coil servo-valve operating in a system according to FIG. 7 and the characteristics of the servo-valve.
Figure 9:
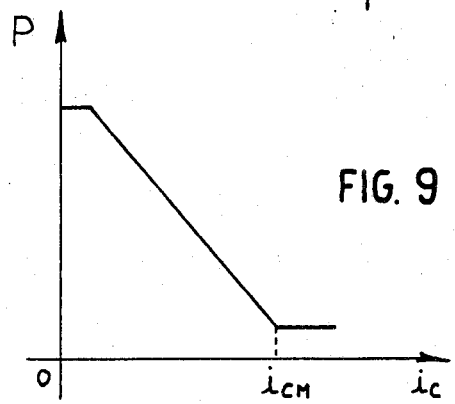

Referring to FIG. 8, when the electrohydraulic servo-valve (or valves) 14 is equipped with two electrical control coils, one of these coils 19 receives the signal ε of strength iε, from the automatic brake regulator 6 and the other coil 20 receives the signal S of strength iS originating from the anti-skid regulator 18. Accordingly, each signal independently effects the servo-valve. If a servo-valve has more than two coils, some of the coils may receive the signal ε and the remaining coils the signal S. In general servo-valves used in anti-skid devices are controlled by pressure and have an inverse characteristic, responding also to brake releasing orders. Explained differently, in the absence of an operating current ic, they allow the full supply pressure to pass on to be used (braking then being at its maximum) and for a maximum electrical order icn, braking pressure delivered is minimal. Every electrical control signal is therefore a brake releasing order. Referring to FIG. 7, it can be seen that the signals transmitted by each regulator (6 and 18) will be effectively added together algebraically to operate servo-valve 14, with the total brake releasing signal being the sum of the brake releasing signal issued by the anti-skid regulator 18 and the signal issued by automatic brake regulator 6. Each of these signals is by itself capable of accomplishing total brake release, whatever the other signal may be. The pressure versus control signal characteristics of a servo-valve of this type is illustrated in FIG. 9.

Figure 10:
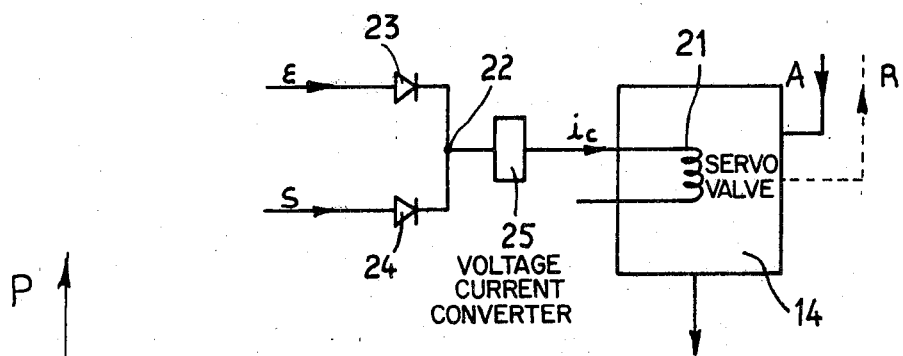
FIGS. 10 and 11 are similar to FIGS. 8 and 9, but relate to a servo-valve having only one coil.
Figure 11:
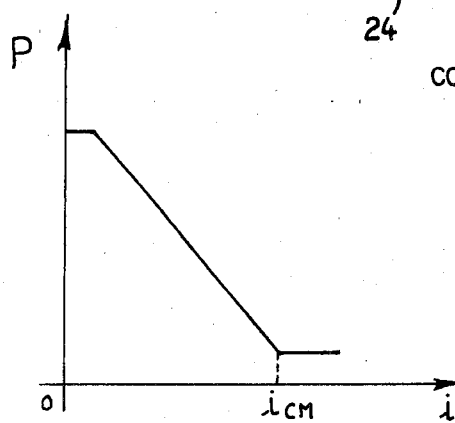

When the electrohydraulic servo-valves 14 have only a single control coil 21 (see FIG. 10), or when it is desired to operate a servo-valve by only one of its coils, it is appropriate to allow only the maximum brake release signal to pass, since this ensures proper operation of the assembly. This maximum signal is ε, originating from automatic braking regulator 6, as long as the required deceleration is achieved. In this case the signal S from the anti-skid regulator 18 will be nil. However, in the event the required deceleration is not achieved, the braking effect produced by the automatic brake regulator 6 is likely to produce skidding and locking of the wheels. In order to limit such skidding, it is then necessary for the signal S from the anti-skid regulator 18 to operate the servo-valve 14. The brake releasing order ε from the automatic brake regulator 6 will then not be effective as the pressure at the brakes will be less than that which is necessary to accomplish the program deceleration. Accordingly, only the greatest brake releasing signal is passed without any risk of instability. This permits very progressive changes in the pressure at the brakes when one or other of the automatic brake 6 and anti-skid 18 regulators is operating without any risk of instability. In this case, the servo-valve having the pressure versus control signal characteristics as shown in FIG. 11 is controlled by the regulator which issues the greatest brake release order, regardless of the signal from the other regulator, which signal is generally contradictory to the first. The transition from control by one regulator to the other can occur only after the existence of a state of equality between the two brake releasing orders and then when one of them becomes greater than the other. The embodiment allowing the choice of the greatest brake releasing order preferably employs a diode discriminator circuit as illustrated in FIG. 10. The signals ε and S arrive at a discriminating point 22 after passing through diodes 23 and 24. The discriminator point 22 will therefore be at the potential of the greater brake releasing signal, and is then subjected to a voltage-current conversion in a unit 25 which delivers an operating current ic to the coil 21 of the servo-valve 14. Discrimination of the greatest brake releasing signal may also be effected by any other electronic means providing the same result, for example by means of one or more separator or isolation amplifiers.

Figure 14:
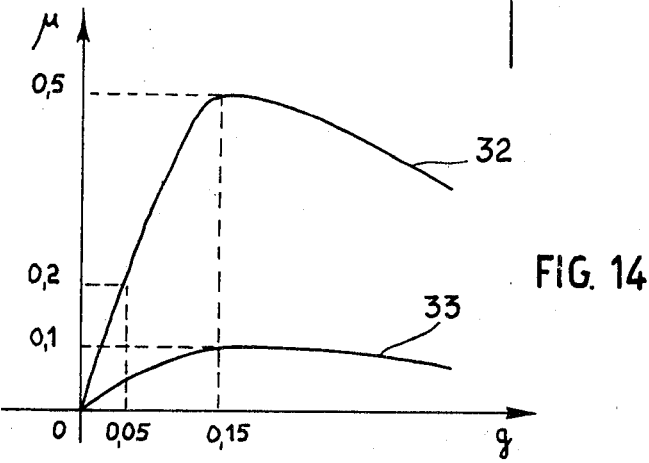
FIG. 14 illustrates a conventional curve relating the coefficient of adhesion with slippage.

A particularly interesting embodiment of the invention exists in relation to vehicles fitted with a speed control anti-skid device. Such an anti-skid device regulates the braked wheels by maintaining their speed at a desired level equal to a function of the reference speed of the vehicle. Wheel slip g which is expressed by the formula $g = (Va - v)/Va$, in which Va represents the vehicle speed and v is the true speed of the wheel, is thus maintained at a definite level, generally of the order of 15%, which corresponds to the best wheel-ground coefficient of adhesion. Of course, this coefficient is achieved only if the torque available at the brakes is sufficient (see FIG. 14). In the event the vehicle is equipped with such an anti-skid device, the program speed may be substituted for the function of the vehicle speed at the input of the anti-skid regulator. Braking is then accomplished according to the program speed, which then becomes a desired speed such that deceleration is accomplished in a definite manner. This is shown in FIG. 12 in which the anti-skid regulator 18 receives through a discriminating logic system 26 of any known kind either the program speed signal Vp or the present speed signal Vc which represents the vehicle speed signal Va multiplied in unit 27 by $(1 - g)$. Moreover, in a conventional manner the regulator also receives the true speed signal from the braked wheel v. Therefore regulator 18 operates in succession as an anti-skid regulator and an automatic braking regulator by delivering either ε or S. A preferred system of discriminating between either the signal Vp or the signal Vc by regulator 16 is by a system of diodes 28, 29 as previously described. The reference speed considered by the regulator will be represented by the greater of the signals Vp and Vc. Substitution of the desired speed Vc for the program speed Vp is thus automatic and progressive in the event the program speed cannot be accomplished. The anti-skid device is therefore in a state of constant supervision to afford safety for the automatic braking system. This embodiment offers considerable simplicity, and also provides considerable security as at any moment during braking, the speed of each braked wheel is monitored by the anti-skid device, the pressure being controlled via the regulator of this device. The speed of the braked wheel will assume the program speed, and there cannot be wheel lockage in the event any of the braked wheels encounters a part of the road surface or runway which offers low adhesion.

In the extreme, if the ground adhesion is so low that the desired law of deceleration is not feasible, the speed of the vehicle tends to exceed the program speed, and control of wheel slippage is implemented with respect to the true speed of the vehicle, as in the case of nonautomatic braking. Thus, further implementation of the program is prevented, and Vp remains a transcript of Va so that in the event adhesion conditions improve, it is possible for braking to return to the chosen law of deceleration. Subjugation of the braked wheel speed to one and the same speed program will help to maintain the vehicle on a straight line. Indeed, the left and right wheels will turn at the same speed and will have a natural tendency to maintain the vehicle on a straight line course. Furthermore, this device makes it possible in principle to counter any risk of sudden swerving as a result of stress on the rudder or steering control of the vehicle.

An example of application of the invention to an aircraft fitted with an anti-skid device functioning by speed control will now be described, though it should be noted that subjugation in speed is similar to subjugation to slip, since slip is mathematically linked to the speeds of the aeroplane and of the braked wheel in question.

For an easier understanding, it should be assumed that the anti-skid regulator allows maximum wheel slippage of 15% of the speed of the aircraft Va, so that it controls the braked wheels so that they turn at a desired speed $Vc = Va(1 - gc) = 0.85\ Va$.

Let it also be assumed that the anti-skid regulator is provided with adequate logic means of known kind to ensure prevention of braking until such time, during landing, as the aircraft sets its main wheels down on the ground, and these are running up to speed, and also are fitted with a device for voltage-current conversion.

Figure 16:
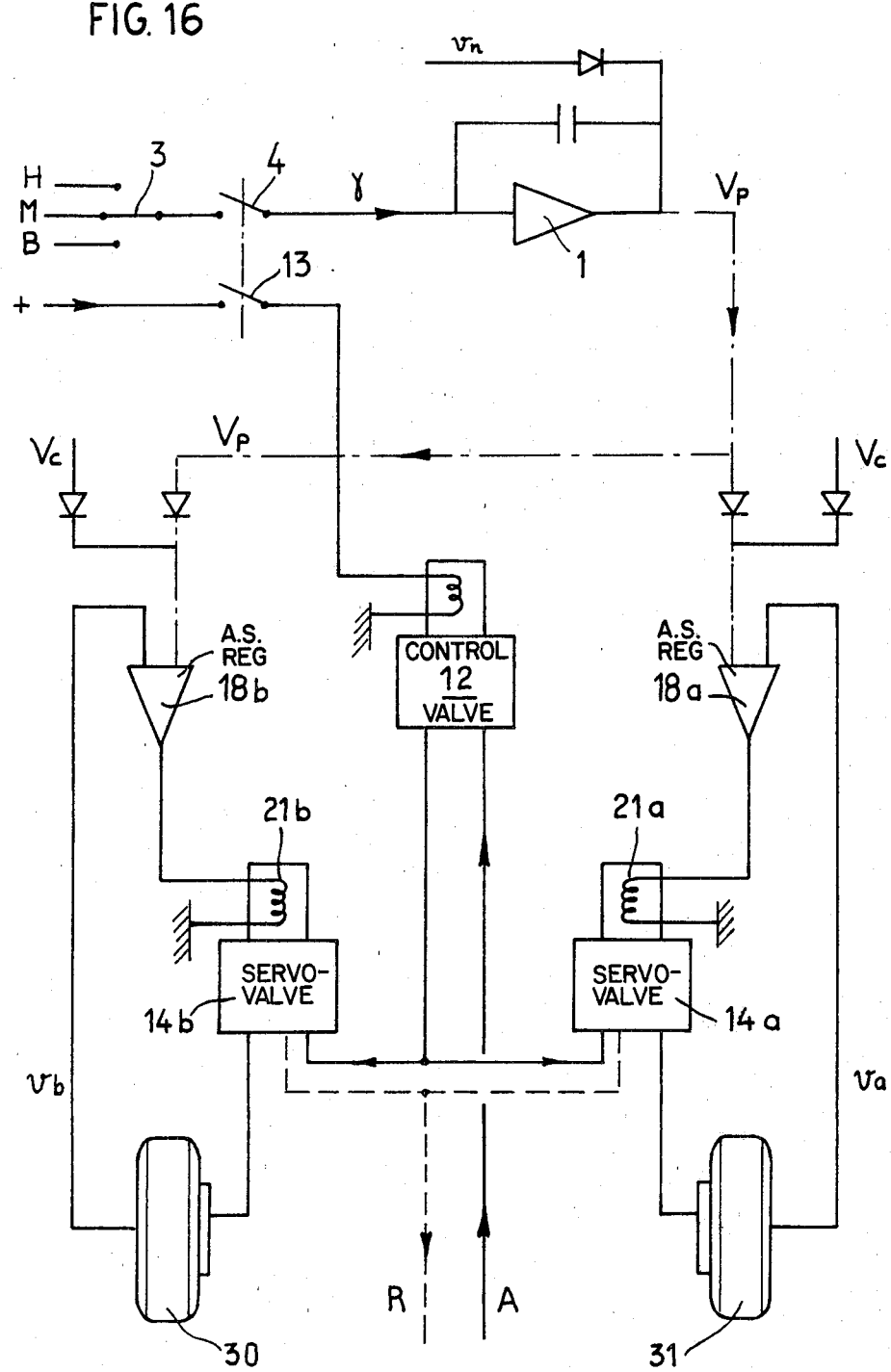
FIG. 16 illustrates a braking system for a vehicle having left and right separately controlled wheels.

A device according to FIG. 16 which makes it possible to control the braking of at least one main left-hand wheel 30, and at least one main right-hand wheel 31 of an aircraft, with automatic braking being triggered by the simultaneous presence of two signals. The first signal is originated by the pilot who triggers automatic braking procedure at a level of deceleration chosen by selector 3. Let it be assumed that such triggering has been effected prior to landing.

The second signal emanates from an external phenomenon and is the result of a combination of suitable logic systems. For example, it may be the output from lift dischargers if braking is to occur as soon as the aircraft has touched down, or it may be an order indicating that the nose wheel is on the ground if braking is to be implemented only after the aircraft has all its wheels down.

In the example, let it be assumed that the automatic braking order is the same as the order issued by the lift dischargers, and that it brings about closure of the switches 4 and 13 shown respectively in FIGS. 1 and 4. It should also be assumed that the aircraft is landing on a dry runway, that is to say the coefficient of adhesion of the tires to the ground is approximately 0.5 for 15% slip, according to the graph giving the coefficients of adhesion $\mu$ as a function of the slip g for a dry runway, and for a wet runway, respectively at 32 and 33 in FIG. 14. Furthermore, it is assumed that the pilot has chosen a constant rate of deceleration of 2 m/s/s.

Figure 15:
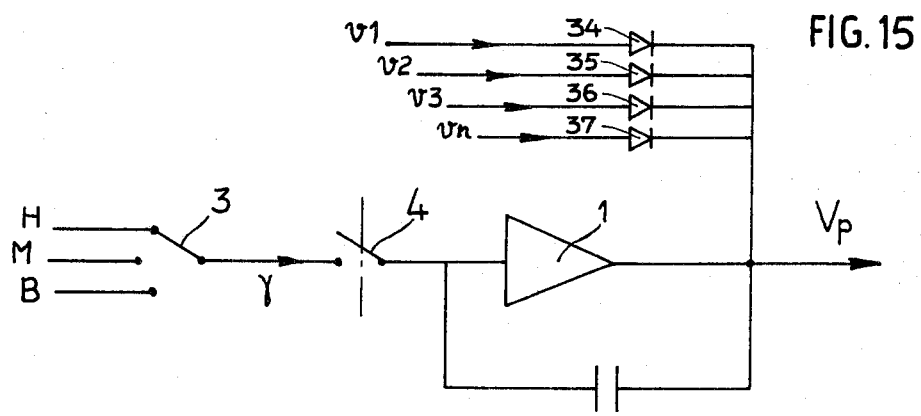
FIG. 15 shows one embodiment of a system for generating an initial program speed signal Vo.

When the aircraft prepares to land, the automatic braking device is set up but not triggered. When the main wheels touch the ground, they run up to speed and the electric voltage emanating from measurement of the speed of wheels by tachometric generators, for example, charges the programming integrator 1 preferably to the value of the fastest wheel, therefore, the highest voltage. This is achieved by the diode discriminating circuit in FIG. 15 in which the voltages $v_1, v_2, v_3, v_n$ representing the speeds of wheels Nos. 1, 2, 3, n is furnished through diodes 34, 35, 36, 37 to the output of the integrator 1 which is then charged to the highest voltage Vn of the fastest wheel. This voltage Vn constitutes the initial program value Vo at the origin of braking. The running up to speed of the main wheels having dispensed with prevention of the braking action previously given by the anti-skid device, when the automatic braking order is given, means first, by closing switch 13 that the electrovalve 12 supplying servo-vales 14a and 14b is operated ensuring pressurizing of braking circuits of the wheels 30 and 31 from a hydraulic supply A, and, second by closing switch 4 integrator 1 furnishes a signal $Vp = Vo - \epsilon t$. The program speed Vp transmitted to the regulators 18a and 18b is decreasing, and becomes less than the speed of the wheels 30 and/or 31, and will therefore cause braking so that there is equality for each wheel between the true speed v and the program speed. The progressive nature of braking is made possible because the true slip of each wheel will be established at approximately 5% for the deceleration chosen, corresponding in the curve 32 in FIG. 14 to a coefficient of adhesion of 0.2, so that the braking torque may be transmitted. The regulators 18a and 18b then are operated by the program speed Vp.

Figure 17:
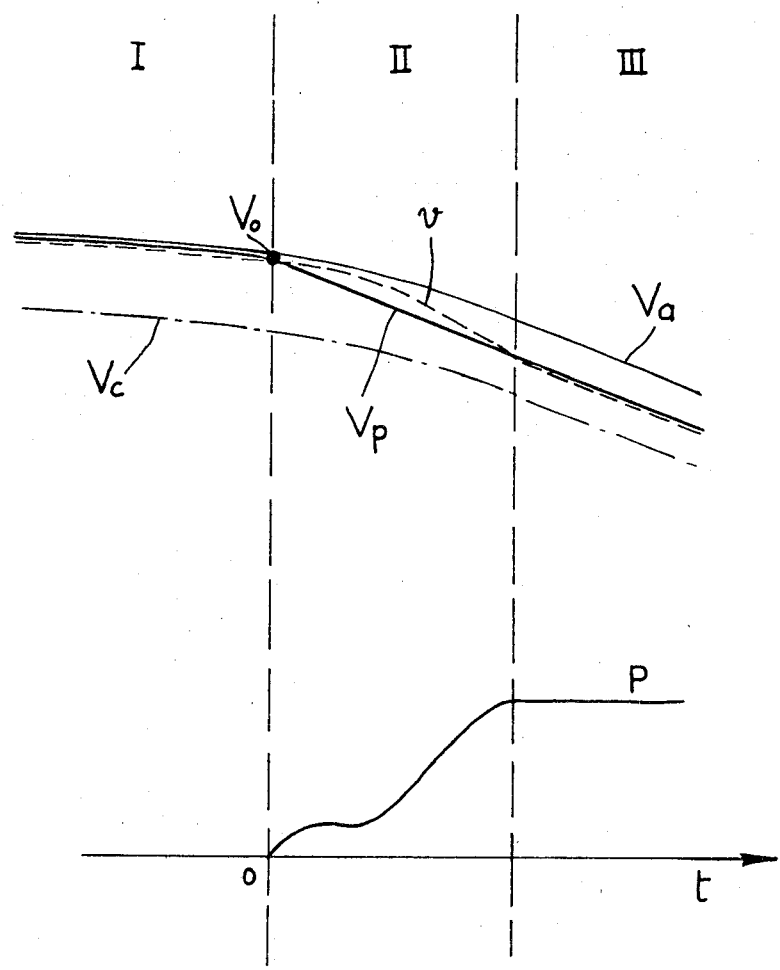
FIG. 17 illustrates graphs of speeds and pressure during the automatic braking of a wheel.

The desired speed $Vc = 0.85\ Va$ is also at the impute of each regulator 18a and 18b, but being less than the program speed, which is established at approx. $Vp = 0.9\ va$, is not used but remains available for the regulators 18a and 18b in a supervisory mode. This is represented in FIG. 17. Before automatic braking is triggered (zone I), the integrator 1 shows a wheel speed v from which the speed of the vehicle is known. Therefore $Va = Vp = v$, and the desired speed Vc of the anti-skid regulators 18a and 18b is equal to 0.85 Va, while the pressure at the brakes P is nil. In the zone II which follows triggering of automatic braking and corresponds to the transitory stage of automatic braking, the signal Vp decreases according to the law $Vp = Vo - \gamma t$, and the pressure p applied to the brakes increases. Correspondingly, the wheel speed v decreases and becomes progressively less than the speed of the aircraft Va, approaching the program speed Vp.

The speed of the aircraft Va decreases progressively remaining greater than v and Vp and the desired speed remains parallel with it. When Vc is aligned with Vp, automatic braking is established (zone III) and Va, Vp or v and Vc evolve in parallel with a slope corresponding to the desired rate of deceleration of the aircraft. The pressure P is then at a given and almost stabilized level.

In the event the aircraft has its tail down, it is essential that braking should not be too great. The deceleration imposed by the program is possibly limited to a maximum value or may be equal to a fraction or a function of the final deceleration required so long as the aircraft has not set down on all its wheels.

As soon as the front landing wheel sets down, a logic order is issued to the automatic brake device so that deceleration assumes its final value.

In the example chosen, the program develops with a deceleration corresponding to 0.2 g and the main braked wheels are maintained at the same speed as in the program. According to FIG. 15, it will be seen that the true slip of the wheels corresponding to a deceleration of 0.2 g is of the order of 5%, the speed of the aircraft is therefore of the order of 105% of the speed of the braked wheels, therefore approximately 105% of the program speed. The true deceleration obtained by carrying out the program is therefore not exactly 0.2 g, but is corrected to take into account the slippage of the wheels, to a value of the order of $(1/1.05)g \times 0.2 = 0.19$ g.

Braking is therefore continued under these conditions until complete stoppage occurs or until such time as the pilot decides to cut out the automatic braking system. He can do this by operating the selector 3 to move it to a stop position, or by some non-specific maneuver which may comprise, for example, applying a determined amount of effort to one or both brake pedals.

Figure 18:
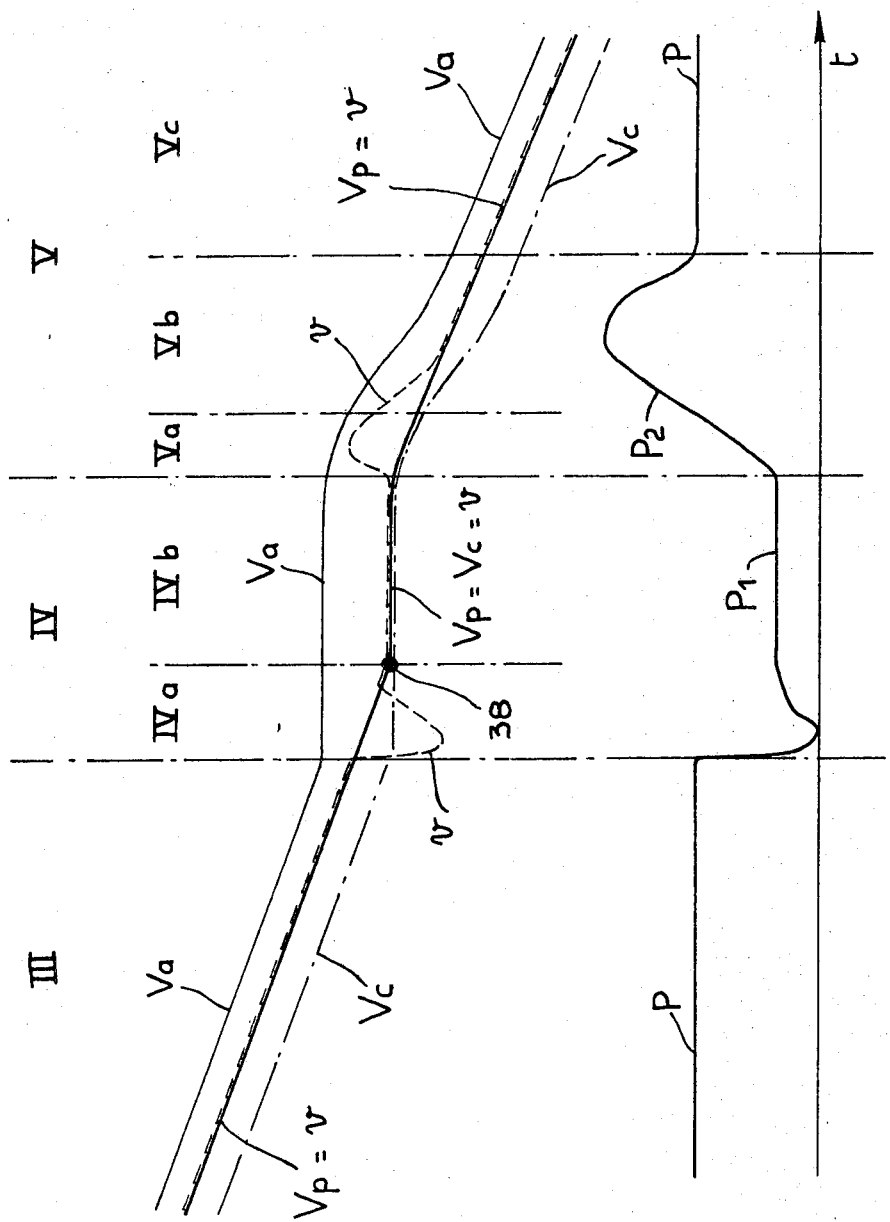
FIG. 18 is an illustration of graphs of speeds and pressure during the passage of an automatically braked wheel through a zone of low adhesion which causes the anti-skid device to operate.

Let it now be assumed that during the course of automatic braking the deceleration required cannot be carried out on a part of the runway of not inconsiderable length where the coefficient of adhesion between the tires and ground does not exceed 0.1 (see FIG. 18).

Zone III of FIG. 18, corresponds in every respect to zone III of FIG. 17; Va, Vp or v and Vc develop in a parallel relationship. When the wheels enter the zone of low adhesion IV, the braking torque proves to be too high and their speed v decreases abruptly and tends to become zero. The regulators 18a and 18b bring about a drop in pressure P at the brakes of the wheels which are running at a speed lower than the program speed, and these wheels are restored to speed so that they can be braked again, but at a level of pressure P1 less than P when their speed v has caught up with the program speed Vp. However the aircraft cannot follow the deceleration required by the program since the maximum deceleration possible is only 0.1 g in zone IV, and the speed of the aircraft Va diminishes far less rapidly than the speed of the program Vp (zone IVa). Therefore, wheel slippage in relation to the aircraft increases. But it is limited to 15%, a level at which the desired speed Vc of the anti-skid device developing parallel with Va, of which Vc is less than 15%, as a tendency to become greater than the program speed Vp (point 38 in FIG. 18) and it is Vc which will serve as a reference for the regulators 18a and 18b. Throughout the entire period when the required deceleration cannot be obtained, the speed of the wheel v remains subject to that of the aircraft Va with 15% slip, as if there were no automatic braking (zone IVb in which braking takes place under the control of the anti-skid device).

As soon as the aircraft again encounters an area with a high coefficient of adhesion (zone V), automatic braking according to program speed Vp can resume. To avoid any abnormal increase in the actual deceleration of the aircraft which would result if the program speed were to then become too low, it is necessary throughout the entire period of the disturbance for the program speed Vp not to fall below the desired speed Vc of the anti-skid regulator. The integrator then records this desired speed Vc (zone IVb and Va) simply by recording the greatest of the speeds of the braked wheels Vn. As soon as the aircraft arrives in zone V which has good adhesion, the wheels will restart, the pressure of the brakes will increase according to P2 and therefore deceleration of the aircraft will also resume. As soon as deceleration becomes equal to that which has been chosen (commencement of zone Vb), the program speed Vp is substituted for the desired value Vc as a reference speed for the regulator or regulators 18a and/or 18b, and automatic braking again occurs following the program, in zone Vc, after a transitory zone Vb in which the speed of the braked wheel is aligned on Vp, Va and Vc decreasing in parallel.

The pressure at the brakes is restored to level P of zone III.

In a manner which is similar to that just described, it is possible to provide an automatic braking device on an aircraft which has electrically operated brake control means. In this case, the electrically operated brake control means acts as the level of the servo-valve which is then used as a pressure distributor. That is, it delivers a pressure which is, for example, proportional to the operating angle of the brake pedal. This electrical operation is generally connected to a servo-valve coil other than that controlled by the anti-skid device, but it is likewise possible to use only a single coil and implement discrimination of the greatest brake release signal as by diode discrimination. It is evident that no braking should take place when the brake pedal is not depressed by the pilot. Since it is useful to supply hydraulic power to the servo-valves outside the braking period, one electro-valve is connected before thereof in the circuit, and the electro-valve is closed when the brake pedals are not being operated.

On the other hand, it is open and therefore the servo-valves are receiving a hydraulic supply as soon as one of the pedals is depressed below a threshold. The current to operate the servo-valves in this arrangement must therefore be a total brake release order which diminishes as the pilot depresses the pedal. At the end of its travel, the electrical order is therefore minimal to correspond to maximum brake pedal pressure.

The installation of an automatic braking device as described requires no modification of the electrical control system.

If the hydraulic circuit already comprises an electrically operated valve to feed hydraulic power to servo-valves, the automatic braking device can use it and in this case no additional hydraulic equipment has to be added.

If it is desired that the electrical braking apparatus not interfere with the automatic braking device under any circumstances, it is sufficient to render the latter inoperative as soon as one of the pilot's brake pedals is depressed so that it allows the signal to energize the electro-valve to pass. Braking is then completely subject to the pilot's will, subject to intervention of the anti-skid device.

On the other hand, if it is desired that the pilot be able slightly to control automatic braking, as for example to create differential braking, both signals should be addable algebraically at the level of the two servo-valve coils.

To ensure the progressive nature of any correction, it is necessary when electrical braking is triggered to create an operational offset equal to the operating current supplied by the electrical control system at the commencement of pedal travel. This offset may be achieved by any known electronic means at the level of the servo-valve operating stage.

Finally, the automatic braking device according to the invention may be fitted on any aircraft which has torque operated brakes. Torque operating braking is virtually electrically operated, considered at the servo-valve. The only difference in the control system is that the signal corresponding to depression of the brake pedal is similar to a desired torque. The signal is compared with a signal corresponding to a measurement of torque so that the electrical signal directed to the servo-valve makes it possible to obtain the required torque at brake level.

The automatic braking system is therefore combined with a torque operating system exactly as with an electrically operated braking system since at the end of the control system the servo-valve still receives equivalent signals. Also it is possible for the automatic braking system to be applied directly with no connection to the torque control system, however an arrangement of this nature does not allow a pilot to provide a slight correction at his option. If such a correction is desired, triggering of the torque operating means must include a compensation of current at the servo-valve level to ensure the progressive nature of the correction.

It is evident that servo-valves having characteristics other than those described in the examples might well be used without departing from the framework of the invention, since it would be sufficient to adapt the operating means so that the servo-valves function in the same way. Finally, the functioning of a certain number of particular automatic braking devices has been described in detail. However, it is apparent that one might combine different features of the disclosed embodiments on a vehicle without departing from the scope of the invention as defined by the appended claims.

What is claimed is:

1. A system for automatically controlling the braking of a vehicle having a braking means, comprising:
    (a) means for generating a program speed signal Vp which varies according to a given plan of deceleration $\gamma$, comprising an integrator receiving a voltage representing the plan of deceleration $\gamma$ and a voltage representing initial speed Vo;
    (b) sensing means for generating a signal Va which is a function of the true speed of the vehicle;
    (c) brake regulator means for comparing said signal Va which is a function of the true speed of the vehicle with said signal Vp of said program speed and for producing a difference signal $\epsilon$ representative of the comparison;
    (d) means, responsive to said difference signal $\epsilon$, for controlling the braking means of the vehicle to cause braking according to said plan of deceleration;
    (e) means, operative when braking is not effective to cause the true speed Va to be controlled in accordance with the program speed Vp, for controlling the braking means with an antiskidding function other than the difference signal $\epsilon$, including an antiskidding regulator means for generating an antiskidding braking command signal S to control the braking means of the vehicle.

2. An automatic braking system as claimed in claim 1, for a vehicle equipped with hydraulically operated brakes, further comprising a hydraulic distribution assembly comprising an electrically operated valve means feeding said braking means of the vehicle via a servo-valve means receiving the difference signal emitted by the brake regulator means to modulate the level of hydraulic pressure applied to the brakes.

3. An automatic braking system as claimed in claim 2, further wherein said servo-valve means comprises two servo-valves, of which one modulates the level of pressure applied to a first assembly of braking means, while the other modulates the level of pressure applied to a second assembly of braking means, the servo-valves receiving their respective control from a distributor receiving the difference signal generated by the brake regulator means and controls representing the action of external phenomena affecting the vehicle.

4. An automatic braking system as claimed in claim 1, for a vehicle of which at least one wheel is braked by hydraulically operated brakes, wherein said antiskidding regulator delivers the antiskidding command signal S to at least one electrohydraulic servo-valve modulating the pressure delivered to the brakes, and said electrohydraulic servo-valve also receives the difference signal $\epsilon$.

5. An automatic braking system as claimed in claim 4, wherein each servo-valve is fitted with two operating coils, of which one receives the difference signal $\epsilon$ from the brake regulator means and of which the other receives the signal S from the antiskidding regulator so that the servo-valve is operated by the algebraic sum of the amplitudes of the two signals.

6. An automatic braking system is claimed in claim 4, wherein each servo-valve is operated by a single coil receiving the larger amplitude signal of the two signals $\epsilon$ and S, with the selection of the larger amplitude signal being effected by a set of diodes.

7. An automatic braking system as claimed in claim 4, wherein the antiskidding regulator regulates the speed of the braked wheels to a desired speed in relation to the speed of the vehicle and in which the regulator receives one or the other of a signal representing the desired speed and the signal representing the program speed in order to deliver to a servo-valve one or the other of the difference signal which implements automatic braking and the antiskidding signal when the deceleration caused by braking in accordance with difference signal $\epsilon$ is not achieved, as indicated by the sensed speed of the vehicle.

8. An automatic braking system as claimed in claim 7, wherein the regulator input signal is amplitude discriminated by a set of diodes.

* * * * *